United States Patent [19]

Diesinger et al.

[11] 4,165,608
[45] Aug. 28, 1979

[54] SENSOR FOR ROCKET ENGINES

[75] Inventors: Walter Diesinger, Bergisch Gladbach; Hans-Joachim Eickmann, Wermelskirchen, all of Fed. Rep. of Germany

[73] Assignee: Dynamit Nobel Aktiengesellschaft, Fed. Rep. of Germany

[21] Appl. No.: 749,423

[22] Filed: Dec. 10, 1976

[30] Foreign Application Priority Data

Dec. 12, 1975 [DE] Fed. Rep. of Germany ....... 2555934

[51] Int. Cl.² .............................................. F02K 9/04
[52] U.S. Cl. ........................................ 60/245; 60/250; 60/254; 60/256; 102/49.6; 102/49.7
[58] Field of Search ................. 60/250, 245, 254, 263, 60/253, 255, 256, 233, 234, 223; 102/81, 49.6, 49.7; 200/83 J, 83 N, 82 R, 82 DA; 73/116, 35

[56] References Cited

U.S. PATENT DOCUMENTS

| | | | |
|---|---|---|---|
| 2,554,266 | 5/1951 | Pauly | 200/83 J |
| 2,926,609 | 3/1960 | Van Goey et al. | 102/81 |
| 3,088,696 | 5/1963 | Matheisel | 60/253 |
| 3,133,410 | 5/1964 | Gessner | 60/234 |
| 3,136,872 | 6/1964 | Banaszak | 200/82 R |
| 3,385,063 | 5/1968 | Brown | 60/253 |
| 3,501,959 | 3/1970 | Womack | 200/83 J |
| 3,726,649 | 4/1973 | Pelham | 60/250 |
| 3,750,590 | 8/1973 | Fisher | 102/49.6 |
| 3,977,187 | 8/1976 | Guillaume | 60/233 |

FOREIGN PATENT DOCUMENTS 1129179 10/1968 United Kingdom .................. 200/82 R

*Primary Examiner*—Robert E. Garrett
*Attorney, Agent, or Firm*—Craig and Antonelli

[57] ABSTRACT

A sensor for rocket engines having at least one combustion chamber including a pressure-sensitive sensing device responsive to pressure in the combustion chamber for providing an output signal to a control device in response to the pressure in the combustion chamber dropping below and/or rising above at least one predetermined pressure. The pressure-sensitive sensing device includes a piston arranged for displacement between first and second positions. The piston is displaceable from at least the first position to the second position in response to a first predetermined pressure value in the combustion chamber. A restoring force is effective for displacing the piston from the second position toward the first position in accordance with a second predetermined pressure value in the combustion chamber. The piston is arranged for triggering a signal in at least one of the first and second positions thereof.

29 Claims, 3 Drawing Figures

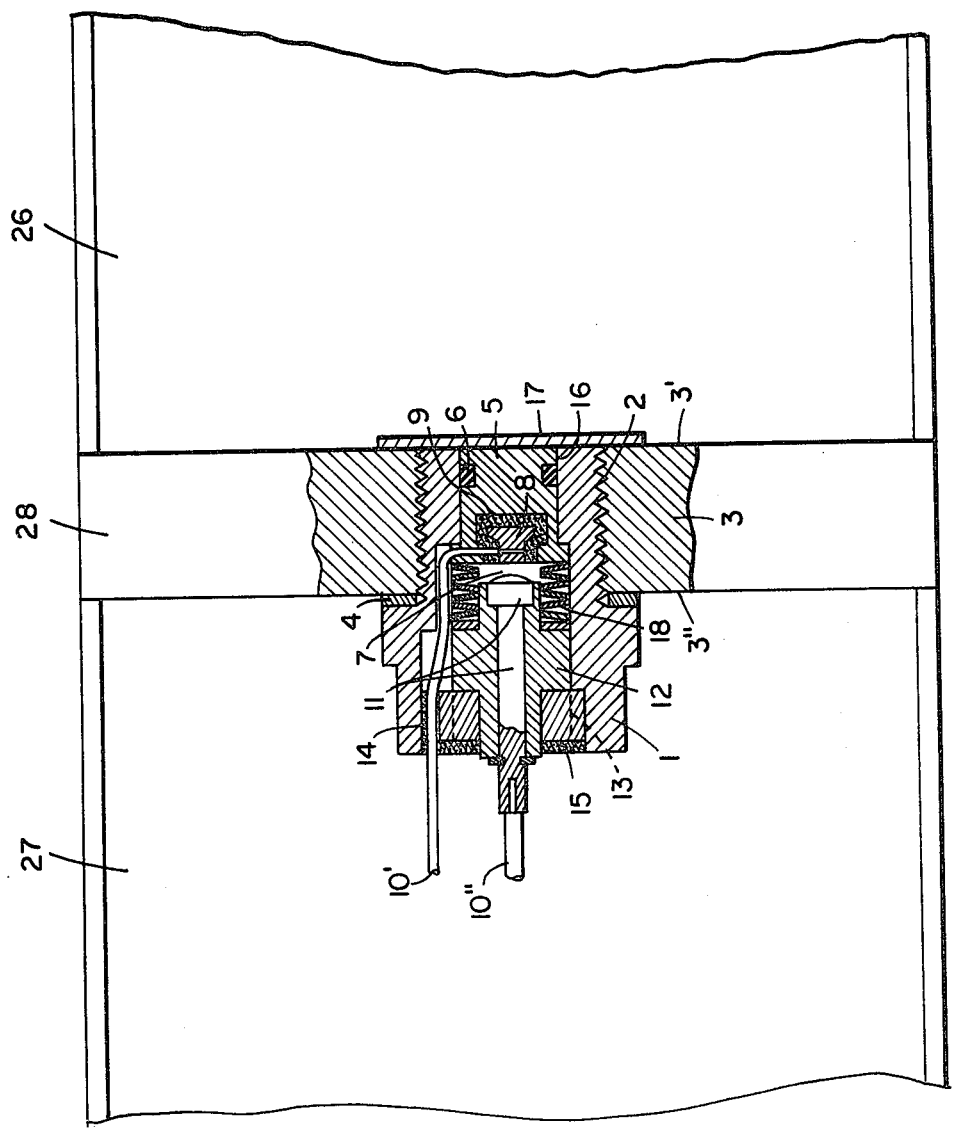

SENSOR FOR ROCKET ENGINES

This invention relates to a sensor for rocket engines with at least one combustion chamber.

In rocket engines, it is frequently necessary to trigger certain functions after burnout, for example to extend braking elements, to eject payloads, or the like. For this purpose, timing elements are utilized which produce the triggering pulse for these functions after a fixedly set time period has elapsed from the firing of the rockets. Since this triggering action takes place independently of the actual burnout, undesired deviations can be encountered in the required functions, so that this procedure is unsatisfactory under practical conditions.

It is therefore an object of the present invention to provide a sensor for rocket engines, particularly solid-propellant rocket engines with one or several combustion chambers, which sensor transmits, at a predeterminable pressure in the respective combustion chamber, a corresponding signal to a control device responsive to the sensor signal, for triggering the function required in each individual case in dependence on the actual combustion chamber pressure with or without delay.

According to the present invention, the provision is made to fashion the sensor as a pressure-sensitive sensor which transmits a signal to a control device responsive to the signal if the pressure in the combustion chamber has dropped below a predetermined minimum pressure. The sensor of this invention responds directly to the respective pressure ambient in the combustion chamber to which it is connected and transmits a signal to the control device if the combustion chamber pressure has dropped below a predetermined pressure threshold value. This pressure threshold value is, in particular, represents or is characteristic of the burnout of the respective combustion chamber, but can also be representative of another condition during combustion within the combustion chamber. Consequently, the triggering of the function is advantageously connected with the respective pressure in the combustion chamber, preferably at the instant of burnout. Such a sensor may be a quartz-type pressure transducer or some other electromechanical pressure transducer having an electronic amplifier connected at the output thereof which yields an electric measuring voltage in correspondence with the respectively measured pressure. The measuring voltage is compared with an electric comparison voltage associated with the predetermined minimum pressure, and if the measuring voltage drops below this comparison voltage, a connection is established to the device connected thereafter in order to trigger the required function, such as, for example, the extension of braking wings, the separation of the rocket nose cone during the dropping of a payload, or the like.

With a view toward a maximally high functional safety, a suitable embodiment of this invention provides a construction of the sensor such that it transmits a further signal to the control device if the pressure in the combustion chamber has risen above a predetermined minimum pressure. The sensor then will produce a corresponding signal during a pressure rise, especially at the start of the combustion, as well as during a drop in pressure, especially at burnout. In this connection, a given minimum pressure for the phase of the pressure increase is preferably selected to be as high as the minimum pressure during the pressure drop, but basically these minimum pressures may also be different from each other. Each signal per se yields the information that the combustion chamber was in operation, whereas the chronological spacing of the two signals moreover yields an indication of the flawless progression of the combustion in the combustion chamber, by comparing this time period with the minimum time period for a proper combustion, and the triggering of the function takes place only if the chronological spacing of the two signals is equal to or larger than this minimum time period. This comparison can be executed, for example, in a manner known per se mechanically by means of an appropriate counting unit. This ensures that, for example, the warhead of a rocket is armed only if the engine operates under proper combustion, i.e. the detonator safety means is released in such a case, whereas this is not done if the combustion was prematurely terminated due to a flaw in the system and the rocket impinges on the ground after a correspondingly shortened trajectory. Consequently, the sensor of this invention represents an additional electromechanical safety feature after the rocket launch for maintaining a specific minimum safety zone during the initial flight phase of the rocket.

A particularly advantageous embodiment of the sensor includes a piston arranged in a housing which can be connected to the combustion chamber. The piston is arranged to be axially displaceable under the action of the pressure ambient in the combustion chamber against a restoring force effective on the piston from a first position into a second position and, upon a drop in the pressure, again being axially displaceable toward the first position. The piston is arranged for triggering a signal in the first and/or second positions. A mechanical pressure switch is thus provided wherein the restoring force for the piston is preferably produced by springs, particularly cup springs. The construction of this mechanical pressure switch is extremely simple as compared to the aforementioned quartz-type pressure transducer or another electromechanical pressure transducer, all of which require an electronic amplifier to be connected at the output thereof, since in this pressure switch there is no conversion of the pressure into an electric voltage which is to be amplified, but rather a mechanical switching operation is conducted in case the pressure value exceeds or drops below the minimum pressures, this switching operation, for example, releasing mechanical locking means, triggering hydraulic control processes, or the like. The switching pressure level can be adapted to the requirements of each individual case in a simple manner, for example by the use of springs having a different spring characteristic and/or by the use of pistons having a different cross-sectional size.

According to a further feature of the present invention, the sensor is constructed such that the piston triggers respectively one signal upon reaching and one signal upon leaving the second position. This feature provides the advantage that no restoring force needs to be effective on the piston in the first position, but rather the restoring force is only built up during the axial displacement of the piston into the second position so that, after the gas pressure of the combustion chamber acting on the piston has dropped, the restoring force is capable of shifting the piston against the gas pressure from the second position toward the first position. If, for example, one or several springs are provided for the restoring force, these can be relaxed in the rest position of the sensor wherein the piston is in the first position, i.e. the springs need not be pretensioned. Thus, the sensor of this invention in the form of a mechanical element does not only exhibit a high reliability, but also a long shelf life.

The signal transmission of the sensor is very simple and reliable in case of an arrangement wherein the piston closes or opens, respectively, an electric circuit in the second position. Preferably, the arrangement is such that the piston closes the circuit when reaching the second position and opens the circuit again upon leaving this position. A simple construction particularly suited to this purpose is provided by arranging one contact of the electric circuit in the piston with another counter contact being arranged in the housing and/or in a contact carrier inserted in the housing so that these contacts touch each other in the second position of the piston. In this connection, the electric lead for the contact to be displaced together with the piston is designed so that it can follow the movement of the contact.

In order to ensure even in case of very long required storage periods of, for example, several years, that no damage, such as a corrosion of the contacts, for example, occurs within the sensor housing, another feature of the present invention provides that an aperture is formed at the end of the housing to be placed in communication with the combustion chamber which aperture connects the piston with the combustion chamber and is sealed by a diaphragm covering the aperture. Thus the housing aperture utilized for exposing the end face of the piston to the combustion chamber is sealed. The diaphragm is constructed so that it does not unduly impede the axial displacement of the piston. For this purpose, the diaphragm can be constructed, for example, as a bursting diaphragm.

A particularly advantageous utilization of the sensor according to this invention is in a rocket engine having two or more independent, chronologically successive thrust phases, wherein the thurst phase of the combustion chamber subsequently to be placed in operation is initiated in correspondence with the signal or signals, from the combustion chamber presently in operation. In these rocket engines with two or more thrust phases, the propellant charges are preferably arranged in axial succession, but they can also be disposed, for example, coaxially to each other. Of special importance are the solid-propellant rocket engines with two thrust phases which are also called double-impulse rocket engines. In such a double-impulse rocket engine, the second thrust phase may only start, i.e. the propellant charge, e.g. in the combustion chamber on the nose side, may be ignited only if the first propellant charge in the previously operating combustion chamber, for example the combustion chamber on the nozzle side, has been duly combusted, in order to exclude excessively high gas pressures which can result in the disintegration of the engine. The two thrust phases need not be in direct succession, in this connection, but rather can be separated by a more or less long flight phase without thrust. If the engine contains three or more independent thrust phases, this requirement then holds true correspondingly for the respectively operative combustion chamber and the combustion chamber to be placed into operation as the subsequent one.

The sensor of the present invention also satisfies the requirement for an additional electromechanical safety feature effective after the launching of the rocket, in that it permits the initiation of the subsequent thrust phase only if, on the one hand, the pressure in the combustion chamber which is, for example, on the nozzle side, has again dropped below a predetermined minimum pressure and, on the other hand, the pressure in the combustion chamber has been higher than this minimum pressure for a period of time assigned to the flawless functioning of this combustion chamber, for example the complete combustion of a solid propellant charge arranged therein.

The control device responsive to the sensor signals and intended for the evaluation of the two sensor signals can operate, as indicated above, for example on a mechanical basis. However, it is advantageous if this device is fashioned instead as an electronic timing element, which emits a trigger pulse in case of a sufficient chronological spacing between the two signals, optionally after an additional delay. The timing element yields the trigger pulse, for example, for the subsequent thrust phase, only if it has received both sensor signals and the chronological interval between the two signals is equal to or larger than the time difference characteristic for an orderly functioning of the combustion chamber, which has been fed to the electronic timing element.

Preferably, the control device emits the trigger pulse only if the chronological spacing between the two signals of the sensor does not exceed a predetermined maximum time interval. With the use of a sensor having such an electronic control device responsive thereto, an additional determination is made whether or not the chronological interval of the two signals exceeds a predetermined maximum time period. A triggering action is executed only if this maximum time period is not exceeded, in order to eliminate malfunctioning due to a short-circuit in the sensor system.

These and other objects, features and advantages of the present invention will become more apparent from the following description when taken in connection with the accompanying drawings, which show, for purposes of illustration only, a single embodiment in accordance with the present invention.

FIG. 3 schematically shows a two combustion chamber rocket engine with a sensor according to the present invention.

Figure 1:
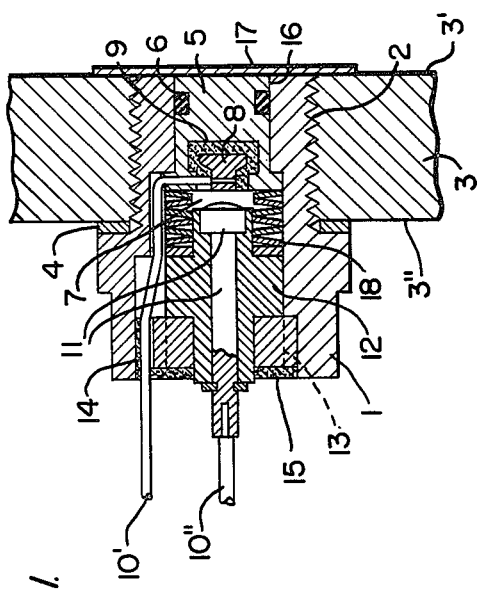
FIG. 1 shows a mechanical pressure switch in a cross-sectional view in accordance with the present invention.

Referring now to the drawing, there is shown in FIG. 1 a sensor constructed as a mechanical pressure switch. The switch includes a housing 1 formed of steel or aluminum, for example, which is threadedly inserted in an aperture 2 of a wall 3, only a section of which is shown, with the interposition of a seal 4. The wall 3 is part of a combustion chamber wall or, in case of an engine having at least two combustion chambers, is preferably part of the partition between the two combustion chambers. In the case of an engine 28 having two combustion chambers, as is assumed herein, the combustion chamber 26 on the nozzle side, or the first combustion chamber, is located on the side 3' of the partition 3, and the adjoining combustion chamber 27 on the nose side, or the second combustion chamber, is located on the side 3" as shown in FIG. 3. The sensor or switch also includes a piston 5 formed of steel or aluminum, for example, having gas pressure contact with the combustion chamber on the nozzle side, and arranged to be axially displaceable within the housing 1. A gasket 6 formed of, for example, silicone rubber is provided between the piston 5 and the housing 1 for preventing hot gases from entering a contact chamber 7 during the first thrust phase and causing damage therein.

On the inside of the piston 5 facing the contact chamber 7, there is inserted a contact 8 made, for example of copper, and fixed in position within the piston by an electrical insulating composition 9, for example a bicomponent adhesive having an epoxy resin base. An electric lead 10' is connected to the contact 8, and this lead is likewise electrically insulated with respect to the piston 5 and also the housing 1. The other contact 11 of the circuit is a contact pin made of copper, for example, which is inserted in a contact carrier 12 and is connected to an electric lead 10". The contact carrier 12 is held in the housing 1 by a screw fixture 13, which is sealed as is a lateral recess 14 in the housing 1 provided for extending the lead 10' therethrough, by a sealing compound 15, such as the aforementioned bicomponent adhesive. An aperture 16 of the housing 1 which faces the combustion chamber on the nozzle side and which is intended for the gas pressure contact of the piston 5, is covered by a bursting diaphragm 17 providing moisture and corrosion protection. The bursting diaphragm 17, made for example of an aluminum foil or a polyethylene film, is glued to the side 3' of the partition wall 3 and is selected with respect to its strength so that it is destroyed by the gas pressure in the combustion chamber on the nozzle side and does not unduly impede the axial displacement of the piston.

A restoring spring 18, in the form of several cup springs, is arranged between the piston 5 and the contact carrier 12. This spring is designed so that the piston 5, when the minimum pressure in the combustion chamber on the nozzle side has been exceeded, moves from the illustrated first position toward the inside to such an extent that the contact 8 touches the other contact 11, whereby an electrically conductive connection is established between the leads 10' and 10", thus closing a circuit so that a first signal is transmitted to a control device connected after the sensor and responsive thereto. The piston 5 is in the second position during this step. After the pressure drops below the minimum pressure upon the burnout of the first thrust phase, the restoring spring 18 lifts the contact 8 off the contact 11 and interrupts the connection between leads 10', 10" and therewith interrupts the circuit therethrough so that a second signal is transmitted to the control device.

The switching pressure level of the mechanical pressure switch can be changed by the use of restoring springs having a different spring constant or also by varying the bias on the restoring spring. A further possibility resides in changing the diameter of the piston such that the force which displaces the piston into the second position against the restoring force and which thus effects the switching step is derived from the end face of the piston exposed to the gases.

The mechanical pressure switch in accordance with the present invention, therefore, connects two electric lines with each other above a pressure level effective thereon, and interrupts these lines below the pressure level, by the use of the feature that a piston under the effect of the gas pressure of the combustion chamber and equipped with a contact is axially movable toward a connecting lead with a counter contact. As compared to a unit comprising, for example, a quartz-type pressure transducer, which requires in addition to the pressure cell with the quartz crystal also an electronic amplifier, the pressure switch described hereinabove is of an extremely simple structure, reliable in its operation, and readily adaptable to varying requirements with respect to the level of the switching pressure, so that this device is also well suitable for mass production.

Figure 2:
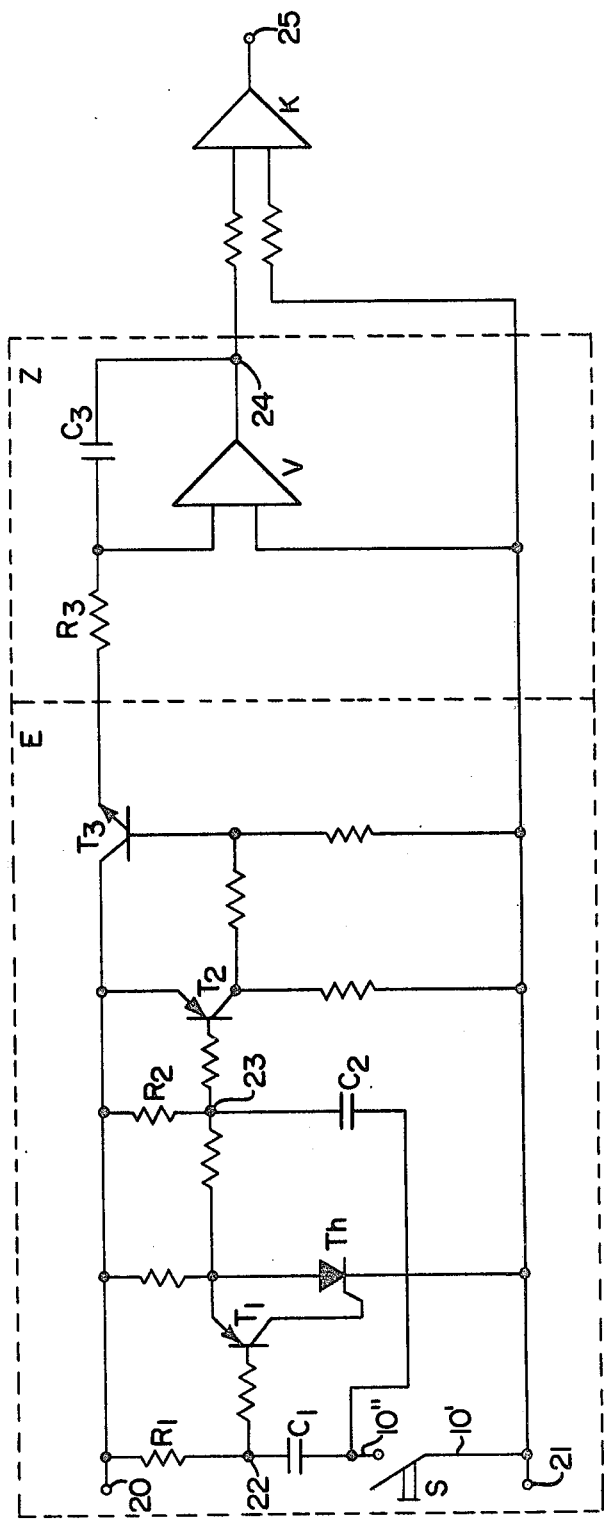
FIG. 2 shows a circuit for an electronic timing element in accordance with the present invention.

FIG. 2 illustrates an electronic timing element in analog design, which can be employed as the control device connected after the sensor of this invention and responsive thereto. Of course, a digital arrangement could also be utilized in place of the analog construction. The contacts 20, 21 are connected to an energy source, not shown, for example by way of a circuit closer or switching arrangement. Upon closing of the sensor S with its leads 10',10", an electronic starting circuit E, shown in dashed line, is activated. In correspondence with the dimensioning of $R_1$ and $C_1$, a voltage is built up at point 22 which, after exceeding a certain level, causes the transistor $T_1$ to become conductive. $R_1$ and $C_1$ provide a first time constant and are dimensioned so that the requirement for the minimum closing time of the sensor S is fulfilled. Consequently, $T_1$ remains blocked or nonconductive if the closing time of the sensor S is too short. With conduction of $T_1$, a thyristor Th is turned on at the same time, and the latter thus takes care, after the elapse of an appropriate firing time, of providing the required operating voltage in the electronic circuit connected thereafter. Once Th has been turned on, the subsequently connected transistors $T_2$ and $T_3$ become conductive and thus a timing loop Z, shown in dashed line, is activated.

The components $R_2$, $C_2$ in conjunction with $T_2$ and $T_3$ provide a second time constant which takes care of the requirement that the chronological spacing of the two signals of sensor S must not exceed a predetermined maximum time period. In correspondence with the dimensioning of $R_2,C_2$, if the sensor S is closed for a longer period of time than the predetermined maximum time interval, the potential at point 23 is changed so that $T_2$ and thus also $T_3$ are rendered nonconductive. The initiated timing loop Z is stopped again in this case.

Thus, during the switching on of the sensor S, a switching voltage is applied to the device connected thereafter by closing the contact. The starting electronic circuit E ensures that the following requirements are fulfilled:

(1) the switching voltage must be applied for a predetermined minimum time period; and
(2) the switching voltage must have dropped again within a predetermined maximum time interval.

As applied to the sensor S, the sensor must be closed over a minimum time period and must be opened again before a maximum time period has elapsed. These conditions represent the safety factor against ignition failures and other functional disturbances in the preceding thrust phase and against short-circuiting within the sensor S and its conductors. If these two conditions are fulfilled, the trigger pulse is produced.

An operational amplifier V of the timing loop Z is constructed as an integrator in combination with components $R_3,C_3$. The comparator K is connected at the output of the timing loop Z, and connects the output voltage of the integrator applied to point 24 and rising with the time, for example to an ignitor (not shown) connectable to point 25, in case a predetermined reference voltage has been exceeded, thus initiating the triggering operation. The components $R_3,C_3$ are dimensioned so as to provide a third time constant which enables the output voltage of the integrator to exceed the predetermined reference voltage after the predetermined maximum time interval within which the switching voltage must have dropped again in accordance with requirement (2). Thus, the triggering output of the comparator K is safely produced.

While we have shown and described only a single embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

What is claimed is:

1. A sensor for rocket engines having at least one combustion chamber comprising pressure-sensitive sensing means responsive to pressure in the combustion chamber, said pressure-sensitive sensing means sequentially providing a first output signal for application to a control means in response to the pressure in the combustion chamber rising above a predetermined minimum pressure which is below that combustion chamber pressure associated with the flawless functioning of the combustion chamber and thereafter said pressure-sensitive sensing means providing a second output signal for application to the control means in response to the pressure in the combustion chamber dropping below a predetermined minimum pressure which is also below that combustion chamber pressure associated with the flawless functioning of the combustion chamber whereby the chronological spacing between said signals provides for an indication of the time period of flawless combustion in said combustion chamber.

2. A sensor according to claim 1, wherein said predetermined minimum pressures for providing said output signals of said pressure-sensitive sensing means are the same pressure.

3. A sensor according to claim 1, wherein said pressure-sensitive sensing means includes piston means responsive to the pressure in the combustion chamber for displacement between at least first and second positions, said piston means being displaceable in response to a first predetermined pressure value in the combustion chamber from at least the first position into the second position thereof, and restoring force means effective on said piston means for displacing said piston means from the second position toward the first position in accordance with a second predetermined pressure value in the combustion chamber, said piston means being arranged for triggering said output signals in at least one of the first and second positions thereof.

4. A sensor according to claim 3, wherein said piston means is displaceable to the second position upon the pressure in the combustion chamber rising above the first predetermined pressure value, said restoring force means causing displacement of said piston means from the second position upon the pressure in the combustion chamber dropping below the second predetermined pressure value.

5. A sensor according to claim 4, wherein the first and second predetermined pressure values are the same pressure values.

6. A sensor according to claim 3, wherein said piston means triggers one of said output signals upon reaching the second position and the other of said output signals upon leaving the second position.

7. A sensor for rocket engines having at least one combustion chamber comprising pressure-sensitive sensing means responsive to pressure in the combustion chamber, said pressure-sensitive sensing means providing an output signal for application to a control means in response to the pressure in the combustion chamber dropping below a predetermined minimum pressure and said pressure-sensitive sensing means further providing an output signal for application to the control means in response to the pressure in the combustion chamber rising above a predetermined minimum pressure, wherein said pressure-sensitive sensing means includes piston means responsive to the pressure in the combustion chamber for displacement between at least first and second positions, said piston means being displaceable in response to a first predetermined pressure value in the combustion chamber from at least the first position into the second position thereof, and restoring force means effective on said piston means for displacing said piston means from the second position toward the first position in accordance with a second predetermined pressure value in the combustion chamber, said piston means being arranged for triggering one of said output signals upon reaching the second position and the other of said output signals upon leaving the second position and wherein an electric circuit is provided for applying said output signals to said control means and wherein said piston means triggers said output signals upon reaching and leaving said second position by respectively closing and opening said electric circuit.

8. A sensor according to claim 7, wherein said pressure-sensitive sensing means includes a housing connected to the combustion chamber, said piston means being axially displaceable in said housing.

9. A sensor according to claim 8, wherein said electric circuit is provided with one contact arranged in said piston means and with another counter contact being arranged in said housing whereby the one and another contacts touch each other in the second position of said piston means.

10. A sensor according to claim 9, further comprising a contact carrier means inserted in said housing, said contact carrier means having said another counter contact arranged therein.

11. A sensor according to claim 3, wherein said pressure-sensitive sensing means includes a housing connected to the combustion chamber with an aperture at an end thereof in communication with the combustion chamber, said piston means being axially displaceable in said housing, said aperture providing a communicating path between said piston means and the combustion chamber, and means for sealing said aperture.

12. A sensor according to claim 11, wherein the means for sealing the aperture is a diaphragm.

13. A sensor according to claim 12, wherein the diaphragm is a bursting diaphragm for bursting at least the first predetermined pressure value.

14. A sensor for rocket engines having at least one combustion chamber comprising pressure-sensitive sensing means responsive to pressure in the combustion chamber, said pressure-sensitive sensing means providing an output signal for application to a control means in response to the pressure in the combustion chamber dropping below a predetermined minimum pressure and said pressure-sensitive sensing means further providing an output signal for application to the control means in response to the pressure in the combustion chamber rising above a predetermined minimum pressure wherein the rocket engine is provided with at least two combustion chambers for independent, chronologically successive thrust phases, the thrust phase of the combustion chamber subsequently to be placed in operation being initiated in correspondence with the output signals provided by the pressure-sensitive sensing means in response to the combustion chamber presently in operation.

15. A sensor according to claim 6, further comprising control means including electronic timing means, said electronic timing means providing a trigger pulse in accordance with at least a predetermined chronological spacing between the signals of said pressure-sensitive sensing means.

16. A sensor according to claim 15, wherein said electronic timing means provides the trigger pulse with an additional delay.

17. A sensor according to claim 15, wherein the electronic timing means provides the trigger pulse only if the chronological spacing between the signals of the pressure-sensitive sensing means is less than a predetermined maximum time interval.

18. A sensor according to claim 17, wherein said control means includes means for initiating said electronic timing means only if said piston means is in the second position for a predetermined minimum time interval.

19. A sensor according to claim 18, wherein said piston means in the second position thereof serves for at least one of closing and opening said electric circuit.

20. A sensor according to claim 19, wherein said pressure-sensitive sensing means includes a housing connected to the combustion chamber, said piston means being axially displaceable in said housing.

21. A sensor according to claim 20, wherein said electric circuit is provided with one contact arranged in said piston means and with another counter contact being arranged in said housing whereby the one and another contacts touch each other in the second position of said piston means.

22. A sensor according to claim 21, further comprising a contact carrier means inserted in said housing, said contact carrier means having said another counter contact arranged therein.

23. A sensor according to claim 22, wherein said housing is provided with an aperture at an end thereof in communication with the combustion chamber, said aperture providing a communicating path between said piston means and the combustion chamber, and means for sealing said aperture.

24. A sensor according to claim 23, wherein the means for sealing the aperture is a diaphragm.

25. A sensor according to claim 23, wherein said restoring force means includes cup spring means.

26. A sensor according to claim 23, wherein the rocket engine is provided with at least two independent, chronologically successive thrust phases, the thrust phase of the combustion chamber subsequently to be placed in operation being initiated in correspondence with the output signal provided by the pressure-sensitive sensing means in response to the combustion chamber presently in operation.

27. A sensor for rocket engines having at least one combustion chamber comprising pressure-sensitive sensing means responsive to pressure in the combustion chamber, said pressure-sensitive sensing means providing an output signal for application to a control means in response to the pressure in the combustion chamber dropping below a predetermined minimum pressure and said pressure-sensitive sensing means further providing an output signal for application to the control means in response to the pressure in the combustion chamber rising above a predetermined minimum pressure wherein said pressure-sensitive sensing means includes piston means responsive to the pressure in the combustion chamber for displacement between at least first and second positions, said piston means being displaceable in response to a first predetermined pressure value in the combustion chamber from at least the first position into the second position thereof, and restoring force means effective on said piston means for displacing said piston means from the second position toward the first position in accordance with a second predetermined pressure value in the combustion chamber, said piston means being arranged for triggering said output signals in at least one of the first and second positions thereof and wherein the rocket engine is provided with at least two combustion chambers for independent chronologically successive thrust phases, the thrust phase of the combustion chamber subsequently to be placed in operation being initiated in correspondence with the output signals provided by the pressure-sensitive sensing means in response to the combustion chamber presently in operation.

28. In a rocket engine having at least one combustion chamber, a sensor comprising pressure-sensitive sensing means responsive to pressure in the combustion chamber, said pressure-sensitive sensing means providing an output signal for application to a control means in response to the pressure for the combustion chamber rising above a predetermined minimum pressure and said pressure-sensitive sensing means further providing an output signal for application to the control means in response to the pressure in the combustion chamber dropping below a predetermined pressure, said predetermined pressures both being below that combustion chamber pressure associated with the flawless functioning of the combustion chamber whereby the chronological spacing between said signals provides an indication of the time period of flawless combustion in said combustion chamber.

29. A sensor for rocket engines having at least one combustion chamber comprising pressure-sensitive sensing means responsive to pressure in the combustion chamber, said pressure-sensitive sensing means including first and second members, said first member being movable into contact with said second member to close an electric circuit and trigger a first output signal from said pressure-sensitive sensing means for application to a control means in response to the pressure in the combustion chamber rising above a predetermined minimum pressure and said first member being movable out of contact with said second member to open said electric circuit and trigger a second output signal from said pressure-sensitive sensing means for application to a control means in response to the pressure in the combustion chamber dropping below a predetermined minimum pressure.

* * * * *